July 7, 1964  R. GRÄFF  3,140,325
MANUFACTURE OF MOLDED BODIES
Filed July 24, 1958  2 Sheets-Sheet 1

Inventor:
Roderick Gräff
By Singer, Stern & Carlberg
attys

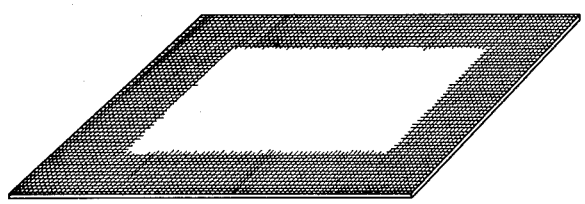
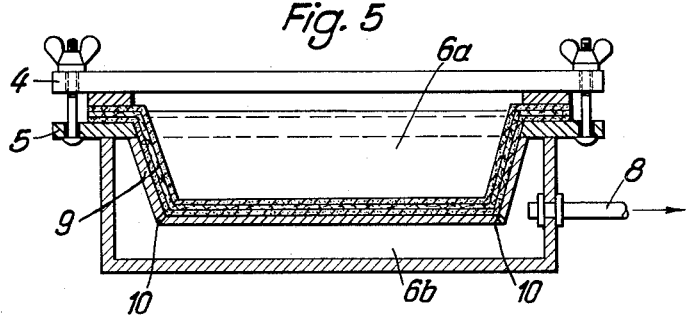
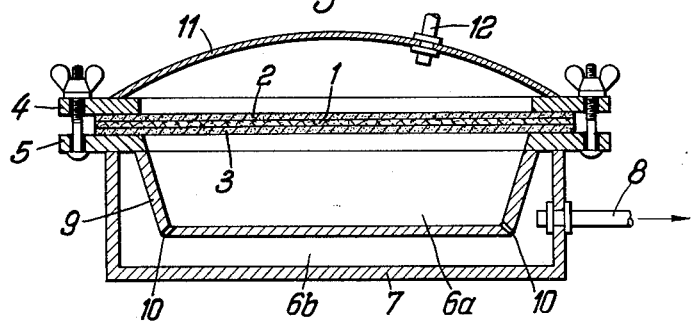
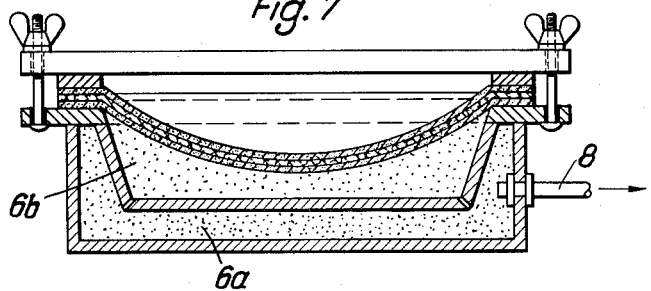

3,140,325
MANUFACTURE OF MOLDED BODIES
Roderich Gräff, Moosburgerstr. 2B, Weiden,
Oberpfalz, Germany
Filed July 24, 1958, Ser. No. 750,792
Claims priority, application Germany July 25, 1957
10 Claims. (Cl. 264—93)

The present invention relates to the manufacture of molded bodies from reinforced synthetic thermosetting plastic materials, especially from polyesters reinforced with glass fibres.

In order to give molded bodies of synthetic thermosetting plastic materials frequently desired mechanical properties, it is necessary to reinforce such materials with, as a rule, glass-fibre matting or glass-fibre fabric.

Various processes are already known and used for the manufacture of molded bodies from thermosetting plastic resins reinforced with glass fibres.

Thus is is known, in the case of the so-called hand-applying processes, to put, on a mold, a separating release agent, for example a wax, on which the reinforcing material, for example glass fibres, is then placed. Synthetic resin is then poured on the reinforcement and, after it has been covered with a foil, such resin is distributed and the air is pressed out of the resin at the same time, in a suitable manner, for example by means of rollers. This known process is not suitable for use on a large scale and, in addition, is only suitable for the production of a single smooth surface. The desired ratio of resin to reinforcement can only approximately be reproduced in successive bodies so that products differing greatly in quality are obtained, the quality depending also on the manner in which the working-up and the pretreatment of the material have been carried out.

It has already been proposed to improve this known process by putting a pre-formed glass-fibre reinforcing mat on a mold, with a synthetic plastic foil and then sucking the resin through the glass-fibre mat with the aid of vacuum. The disadvantage of this improved process is that whilst a perfectly smooth surface is obtained, it is not possible to obtain a moulded body which is quite free from air bubbles or inclusions. In addition, this process cannot be carried out without previously shaping the reinforcing material.

Finally, it is already known to insert a reinforcement, e.g. a glass-fibre mat, between complementary mold elements of a press and to pour resin in. The press is then closed and the molded body is hardened by means of heat. Although this process renders possible large-scale operations and permits the production of two smooth surfaces on the molded body, it necessitates great expense in molds and a rigid fibrous structure. Furthermore, as in the case of the processes hereinbefore mentioned, the reinforcing material, for example matted glass fibres, has to be previously shaped in a separate operation and, as a rule, even by means of special machines.

These known processes also have the disadvantage that they are not suitable for the production of parts having large surfaces. The process according to the present invention, for manufacturing molded bodies from reinforced synthetic thermosetting plastic materials, especially polyesters reinforced with glass fibres, obviates the aforesaid disadvantages of the known processes by reason of the fact that, before the actual molding operation, the reinforcing material is first impregnated in the flat condition, for example as a glass-fibre mat or glass-fibre fabric and arranged between two foils. This can be done, either by hand or by machinery. Since it is possible to start from flat glass-fibre mats or fabrics, the relatively expensive preliminary shaping is avoided. Furthermore, it is technically possible to carry out the impregnating operation in the known manner by enclosing only the glass-fibre mat and resin between the two foils, in such a manner as to prevent air inclusions and bubbles. The impregnated reinforcing material is then, together with the foils enclosed in such material, molded by applying different fluid pressures to the opposite sides thereof and the synthetic resin is allowed to harden, at least partially, in the bodies thus shaped, by the action of catalysts or accelerators in the resin and/or by heat.

Advantageously, the reinforcing material, which has been placed between the two foils and impregnated with synthetic resin, may be clamped at the edges in a frame while the synthetic resin is still in the liquid or viscous condition and then be molded to the desired shape by reducing or increasing the fluid pressure on one side thereof so that the assembly bows freely under the pressure differential, the resin thereafter being allowed to harden, at least partially, to retain the shape thus molded.

Alternatively, and according to a further feature of the invention, the reinforcing material, which has been impregnated with synthetic thermosetting plastic material, together with the foils that surround it, may be clamped in a frame and then be deformed by a fluid pressure differential into conformity with a die or mold and the synthetic plastic then allowed to harden, at least partially, to retain the shape thus molded.

The advantages obtained by the invention are very remarkable in comparison with the known art. In contradistinction to the vacuum process and the hand-applying process, discussed above, two perfect and smooth surfaces are produced, which do not require any after-treatment. In comparison with the press processes, the expenditure on machinery is small and, in addition, a preshaping of the reinforcing material is unnecessary. Furthermore, it has been found that the fibrous structure of the articles produced by the process according to the invention is optically faultless so that the process may be used for the manufacture of transparent articles. Also, a complete freedom from air bubbles and inclusions is obtained. For the production of certain shapes it is not at all necessary to provide a special mold or die, since with correct control of the molding fluid pressure differential the foils take over the function of the mold or die.

When the molding fluid pressure differential is achieved by reducing the pressure on one side of the assembly of reinforcement and foils, the space between the foils can also be subjected to reduced pressure in order to ensure a firm pressing of the foils upon the mass of synthetic resin and reinforcement.

Accurate molding may most conveniently be achieved by the use of liquid as the pressure fluid, such liquid being pumped out of a chamber on one side of the assembly to produce the desired pressure differential, since the degree of shaping of the foils lying on the surface of the liquid can be regulated extremely simply by regulation of the quantity of liquid pumped out, which quantity can be measured very accurately.

There may normally be employed as the foils, materials such as, for example, cellophane, cellulose acetate, polyvinyl chloride, polyethylene, polyesters etc., which act as so-called separating foils and are removed from the molded body after hardening thereof. However, on the other hand, foils of materials which bond to the synthetic resin may be used, and in this way the surface properties of the molded body can be greatly improved. Thus, for example, when using polyesters as the synthetic thermosetting plastic material, foils of cellulose acetobutyrate may be employed. As synthetic thermosetting plastic resin materials which are hardenable by catalysts or heat, polyester resins and epoxy resins may be employed.

The present invention also provides apparatus for carrying out the process according thereto.

Various embodiments of the invention are illustrated in the accompanying drawings, in which:

FIGURE 4 is a top perspective view of a glass-fibre mat with its edges reinforced by overlapping;

FIGURE 5 is a section through apparatus in which the body to be molded is deformed into a mold by reducing the pressure on the mold side of the assembly;

FIGURE 6 is a section through apparatus which molds an assembly by the application of increased pressure to one side thereof; and FIGURE 7 shows, in section, apparatus similar to that of Figure 5 but in which there is a liquid in the space at the mold side of the assembly.

Figure 1:
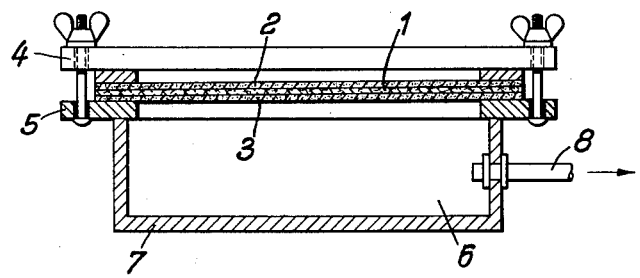
FIGURE 1 is a section through an assembly constituted by a glass-fibre mat enclosed between two foils and impregnated with a synthetic plastic resin material, clamped in apparatus for effecting molding of such assembly.
Figure 2:
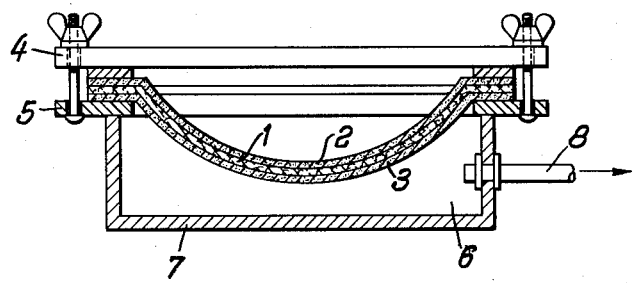
FIGURE 2 is a section through the apparatus shown in Figure 1, during the manufacture of a dome with a circular or rectangular flange, after the molding step performed by reducing the pressure on one side of the assembly.

As shown in Figure 1, a glass-fibre mat 1, which is enclosed between foils 2 and 3 and impregnated with synthetic thermosetting plastic resin, is clamped at its edges between the flange of a lid 4 and the flange 5 of a pressure-tight chamber 6. The sealing surfaces of the lid 4 and of the flange 5 thus form a clamping frame for receiving the edge parts of the molded body to be produced. In the example shown in FIGURE 1, the pressure-tight chamber 6 is constituted by a bottom wall 7 bearing the flange 5 is located below the assembly of mat 1 and foils 2, 3. The chamber 6 communicates with a vacuum pump (not shown) through a pipe 8 that is fixed to the wall 7. On operating the vacuum pump to evacuate the chamber 6, the glass-fibre mat impregnated with a thermosetting plastic material, together with the foils, is pulled into the evacuated chamber. The vacuum pump is operated until a desired rise-to-span ratio, for example the position shown in FIGURE 2, is reached. In this simple method of manufacture, no special shaping mold or die is necessary. The molded body hardens by itself or under the action of heat, according to the composition of the resin. After a relatively short time, the molded body becomes self-supporting and can be removed from the frame for final hardening. The speed of hardening of the resin can be fixed by the quantity and nature of the catalysts and accelerators that have previously been added thereto. The removal of the molded body from the edge clamp offers no difficulty, since the foils 2, 3 do not adhere to the flanges of the lid and pressure chamber.

Before being clamped in the chamber 6, the assembly of glass-fibre mat 1 and foils 2, 3 is impregnated, by machinery or by hand. The foils 2, 3 may, for example, be formed of cellophane correctly adjusted as regards its tenacity. For impregnation, cold-setting as well as thermosetting polyester resins or epoxy resins are suitable.

The process illustrated by FIGURES 1 and 2 is especially suitable for the production of light domes which are relatively uniformly curved and have to be transparent or translucent. It has been possible to manufacture light-domes economically, by the processes hitherto known, only from thermoplastic materails, for example methacrylates, since it has hitherto been impossible to obtain the faultless fibrous structure, which is necessary for light domes, as well as a uniform shape and smooth surfaces, for such relatively large molded bodies of polyesters reinforced with glass fibres. The employment for this purpose of polyesters reinforced by glass fibres, which is rendered possible by the process described, results in a considerable economy in the production of light domes.

Figure 3:
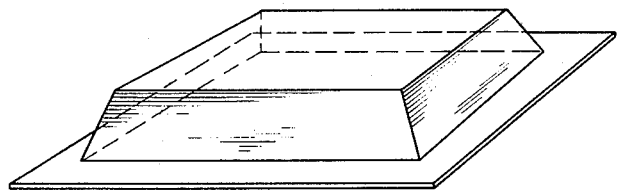
FIGURE 3 shows a hood made by the process according to the invention.

FIGURES 3 and 4 show a hood made according to the invention and a glass-fibre mat used for the production of this hood and specially reinforced at its edges. In addition to being reinforced at its edges, the glass-fibre mat may be reinforced at other positions which are particularly greatly stretched or are to be made particularly greatly reinforced in the finished condition.

In the case of the apparatus illustrated in FIGURE 5, the assembly to be molded is pressed against a mold or die 9 under the action of a vacuum, the mold or die 9 in this case is provided with bores 10 which connect the die space 6a with the vacuum space 6b proper. The assembly 1, 2, 3 after being clamped in between the lid 4 and the flange 5, is deformed firmly against the die 9 and thus assumes a shape corresponding to the die 9.

The process of the invention can also be carried out with apparatus as shown in FIGURE 6 which operates with fluid under pressure. The assembly 1, 2, 3 in this case is clamped at its edges between the flange of the lid 4 and the flange 5, over the die 9 which, as in FIGURE 5, is provided with bores 10 in order to connect the spaces 6a and 6b on the two sides of the die with each other. The space 6b is evacuated through the pipe 8. The lid 4 is covered by a closing cover 11 through which passes a pipe 12 for supplying compressed air or other fluid under pressure to the space above the assembly 1, 2, 3.

In FIGURE 7 apparatus is illustrated in which a specially fine adjustment of the rise-to-span ratio is obtained by sucking, from the spaces 6a and 6b, not air but liquid by means of a pump. This embodiment allows a specially easy and automatic regulation of the molding.

I claim:

1. The process of manufacturing reinforced synthetic thermosetting plastic molded bodies of spherical and various geometrical shapes which comprises: interposing a flat layer of reinforcing material which has been impregnated with a synthetic thermosetting plastic resin between two foils while the thermosetting plastic resin is in a liquid and viscous condition to form a molding assembly; securing the edges of the assembly against movement; applying a fluid pressure differential to the opposite sides of the assembly to mold the assembly to a desired shape; and thereafter hardening said resin to retain the molded shape of the assembly.

2. The process according to claim 1, in which said fluid pressure differential molds said assembly into conformity with a rigid surface disposed on one side of said assembly.

3. The process according to claim 1, in which the fluid pressure on at least one side of said assembly is produced by a liquid.

4. The process according to claim 1, in which the space between said foils and filled by resin impregnated reinforcing material is maintained under a reduced pressure during molding and until the resin has at least partially hardened.

5. The process according to claim 1, in which said foils are formed of materials selected from the group consisting of cellulose glass, cellulose acetate, polyvinyl chloride, polyethylene and polyesters.

6. The process according to claim 1, in which said foils are formed of a material which bonds with the synthetic thermosetting plastic resin with which the reinforcing material is impregnated.

7. The process according to claim 1, in which said foils are formed of cellulose aceto-butyrate and the reinforcing material is impregnated with a polyester resin.

8. The process according to claim 1, in which the synthetic thermosetting plastic resin is mixed with a hardening catalyst prior to impregnation of the reinforcing material.

9. The process according to claim 8, in which the synthetic thermosetting plastic resin is selected from the class consisting of polyesters and epoxy resins.

10. The process according to claim 1, in which the layer of reinforcing material is made of increased density in areas of the assembly which form molded body parts requiring increased strength.

References Cited in the file of this patent

UNITED STATES PATENTS

| | | |
|---|---|---|
| 1,971,384 | Ritter | Aug. 28, 1934 |
| 2,363,431 | Moorhouse | Nov. 21, 1944 |
| 2,441,097 | Hicks | May 4, 1948 |
| 2,596,162 | Muskat | May 13, 1952 |
| 2,613,397 | Borkland | Oct. 14, 1952 |
| 2,648,099 | Dunmire | Aug. 11, 1953 |
| 2,760,233 | Bjorksten | Aug. 28, 1956 |
| 2,783,500 | Lazarr | Mar. 5, 1957 |
| 2,830,818 | Otto | Apr. 15, 1958 |
| 2,881,110 | Walker et al. | Apr. 7, 1959 |
| 2,894,621 | Ambrose | July 14, 1959 |
| 2,962,764 | Trojanowski et al. | Dec. 6, 1960 |